United States Patent [19]

Hill

[11] Patent Number: 5,007,167
[45] Date of Patent: Apr. 16, 1991

[54] BLADE MODIFICATION TOOL AND PROCESS

[76] Inventor: Jamie R. Hill, 1325 SE. Fourth St., Cape Coral, Fla. 33904

[21] Appl. No.: 445,375

[22] Filed: Dec. 4, 1989

[51] Int. Cl.⁵ .......................................... B27B 11/004
[52] U.S. Cl. ................................. 29/889.1; 269/296; 269/902; 83/462; 29/401.1; 29/557; 29/559
[58] Field of Search .................. 83/477.1, 462, 484; 29/889.1, 401.1, 557, 559; 269/71, 76, 246, 296, 902

[56] References Cited

U.S. PATENT DOCUMENTS

| | | | |
|---|---|---|---|
| 527,815 | 10/1894 | Schnell | 269/76 |
| 1,312,306 | 8/1919 | Campbell | 269/296 |
| 1,342,515 | 6/1920 | Theimer | 269/293 |
| 2,310,255 | 2/1943 | O'Connell | 269/296 |
| 3,362,295 | 1/1968 | Galbarini et al. | 269/296 |
| 3,848,863 | 11/1974 | Owen | 269/296 |
| 3,854,360 | 12/1974 | Reed | 83/522.19 |

Primary Examiner—Douglas D. Watts
Assistant Examiner—Allan M. Schrock
Attorney, Agent, or Firm—Frank A. Lukasik

[57] ABSTRACT

The principle utility of the blade modification tool is as a work holder for holding a helicopter blade in a firm position and a process for cutting at least two feet from the end. More specifically, in conformity with FAA regulations, a Bell Helicopter Model UH-1H rotor blade assembly may be modified for FAA approved installation on the Bell Helicopter Model UH-1B.

6 Claims, 2 Drawing Sheets

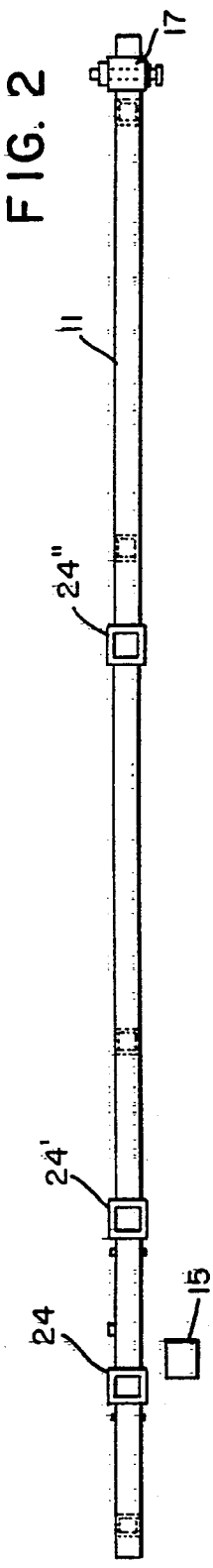
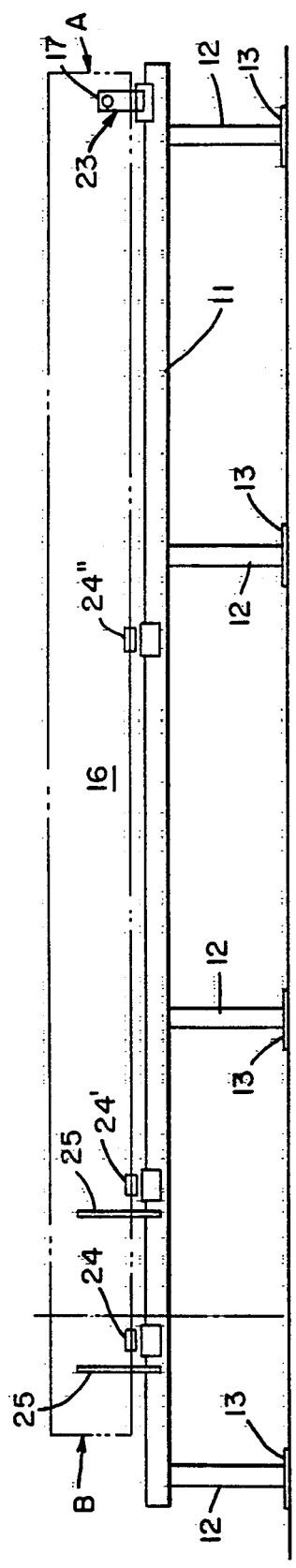
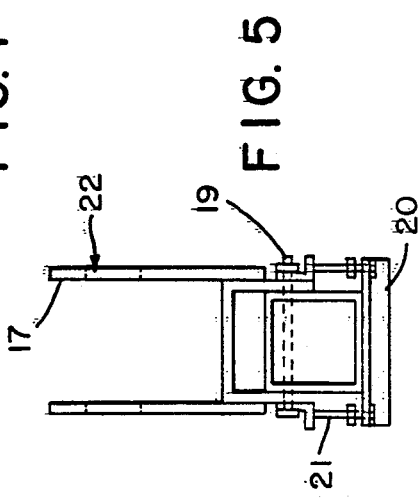
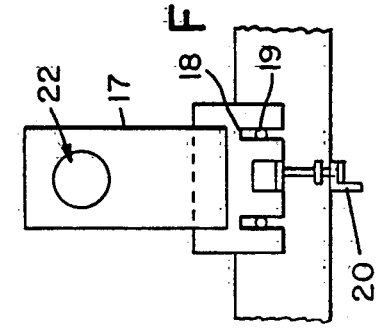
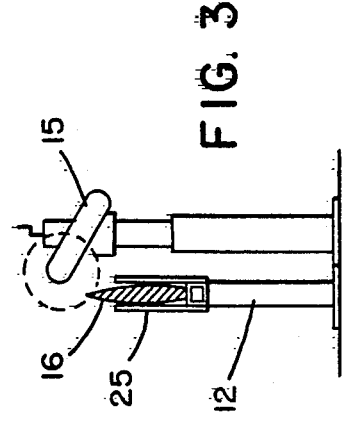

BLADE MODIFICATION TOOL AND PROCESS

BACKGROUND OF THE INVENTION

1. Field of the Invention

This invention relates to a work holder for use for supporting long helicopter rotors during blade modification and a process for the surgical removal of the outer tip to provide a rotor that is structurally, aerodynamically, and dynamically identical to the longer rotor blade. The invention deals more particularly with a work holder to support a Bell Helicopter Model UH-1H rotor blade assembly and a process for modifying the blade for FAA approved installation on the Bell Helicopter Model UH-1B.

2. Description of the Prior Art

There are several prior art work holders for supporting long objects to be worked on. For example, U.S. Pat. No. 1,312,306 to Campbell discloses an improvement in horses used in window glass factories for supporting the glass cylinders after they have been taken down, and while they are being cut into smaller cylinders. Connections are provided between supporting members of the horse whereby pressure or weight on one member will be transmitted to another or others and thus cause them to adjust themselves to the surface of the cylinder and evenly support the latter throughout its length irrespective of differences in diameter so that the weight of the cylinder will be evenly distributed on the supporting member of the horse. U.S. Pat. No. 3,362,295 to Galbarini et al discloses a work holder for use for supporting large sized rotors of electric machines during longitudinal milling thereof on a milling machine. The work is rotated by a simple manipulation, avoiding torsional deformations and protecting at the same time the previously milled slots against mechanical damage. U.S. Pat. No. 3,848,863 to Owen discloses a welding jig which includes a pair of parallel rails which support at least two movable carriages. The patent to Owen uses rollers mounted on parallel shafts to hold circular parts and rotate them as they are being processed. None of the prior art devices are used on nor can they be used on such a varying shape as a helicopter blade nor do they require the precision and care to meet FAA regulations. The device and process of the instant invention has been granted Department of Transportation-Federal Aviation Administration Supplemental Type Certificate Number SA2621SO.

SUMMARY OF THE INVENTION

The principal utility of the blade modification tool and process is as a work holder for holding a helicopter blade in a firm position and a process for cutting at least two feet from the end. More specifically, with this invention, in conformity with FAA regulations, a Bell Helicopter Model UH-1H rotor blade assembly may be modified as described herein for FAA approved installation on the Bell Helicopter Model UH-1B.

Therefore, there is a need for a simple, rugged, accurate work holder for holding a rotor blade in position while the process for reducing the length is practiced.

It is therefore an object of the invention to provide a device for holding a helicopter rotor blade securely to accurately and non-destructively shorten the blade.

It is another object of the invention to provide a work holder and process to modify a helicopter rotor blade for FAA approved installation.

Still another object of the invention is to provide a work holder and process whereby a Bell Helicopter Model UH-1H rotor blade assembly may be modified for FAA approved installation on the Bell Helicopter Model UH-1B.

These and other objects of the invention will become apparent to those skilled in the art to which the invention pertains when taken in light of the annexed drawings.

BRIEF DESCRIPTION OF THE DRAWINGS

FIG. 1 is a side view of the blade modification tool.
FIG. 2 is a top view of the blade modification tool.
FIG. 3 is an end view of the blade modification tool.
FIG. 4 is a side view of the blade pin bolt support bracket.
FIG. 5 is an end view of the blade pin bolt support bracket.

DESCRIPTION OF THE PREFERRED EMBODIMENT

Figure 6:
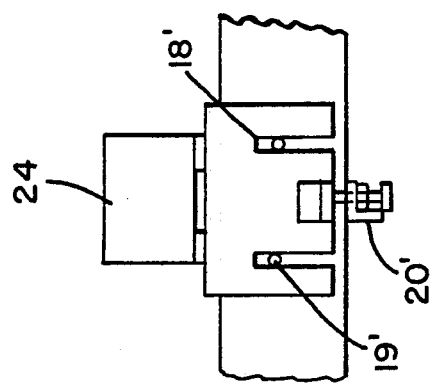
FIG. 6 is a side view of a blade support bracket.

Referring now in more detail to the drawings, FIGS. 1 and 2 show base 11 constructed of 4"×4"×¼" tubular steel column and supported by legs 12 constructed of the same material. Base plates 13 affixed to legs 12 are secured to the floor with four ½" redhead anchors (not shown). A stationary cut-off tool 15 is fastened to the floor precisely 24" from the tip "B" of rotor blade 16 and within the cutting radius of tool 15. Stationary cutting tool 15 is capable of being adjusted vertically at least 22" or the width of rotor blade 16.

FIGS. 1, 4 and 5 show blade pin bolt support bracket 17 fastened to the base 11 near the blade base "A". Height adjustment slots 18 are fitted on through bolts 19 and mounting clamp 20 is set by tightening set screws 21. Blade pin hole 22 is provided in support bracket 17 to fix the position of blade end "A" with the insertion of blade pin bolt 23.

Figure 7:
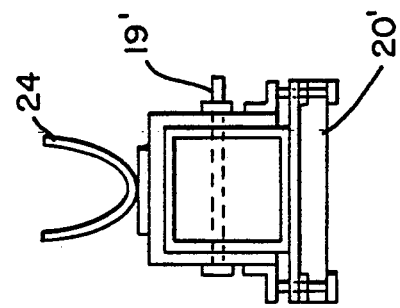
FIG. 7 is an end view of a blade support bracket.

FIGS. 1, 6 and 7 show blade support brackets 24 fastened to the base 11 at the positions shown. Height adjustment slots 18' are fitted on through bolts 19' and mounting clamp 20' is set by tightening set screws 21'. Blade support brackets 24 are generally "U" shaped to conform to the shape of the rotor blade to prevent any damage to the outer skin of the rotor blade. A first blade support bracket 24 is located near the rotor blade end "B" (approximately 33½" from the end of base 11) to help support the blade tip which is being removed by the process of the invention. A second blade support bracket 24' is fastened to the base 11 near the rotor blade end "B" (approximately 65") from the the end of base 11 to support the end of the modified (remaining) blade. A third blade support bracket 24" is fastened to the base 11 approximately 108" from blade pin bolt 23.

Figure 8:
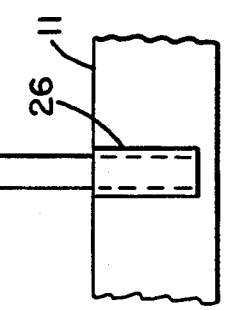
FIG. 8 is a side view of the lateral support arms.
Figure 9:
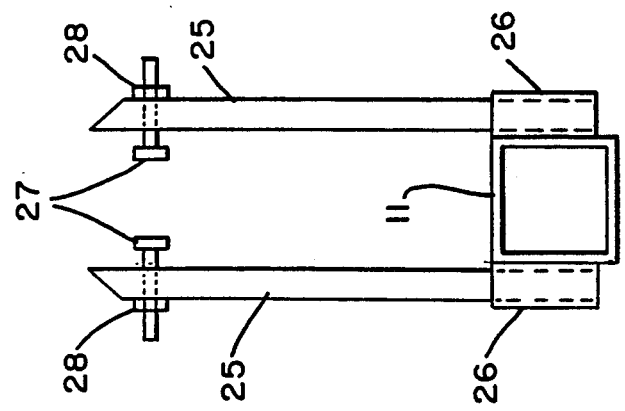
FIG. 9 is an end view of the lateral support arms.

FIGS. 1, 8 and 9 show lateral support arms 25 made from 1"×1" steel tube inserted into sleeves 26 which are fastened to base 11. At the upper end of support arms 25 are adjustment bolts 27. When the adjustment bolts 27 are set to hold the blade 16 firmly, nuts 28 are tightened to lock bolts 27 securely. The lateral support arms 25 serve the function of vibration isolators.

CUT-OFF PROCEDURE

It has been shown that the Model UH-1H rotor blade, referred to as the "1H" blade, is essentially identical to the Model UH-1B rotor blade, referred to subsequently as the "1B" blade. The difference consists of an additional 24.0" of blade on the "1H" model, the additional length existing from the tip inboard.

A surgical removal of the outer 24" of the "1H" blade, the addition of a "1B" tip unit, and the relocation of the trim tab to conform with the location on the "1B" provides a rotor blade that is structurally aerodynamically, and dynamically identical to the "1H" rotor blade.

The process is started by installation of the blade 16 on base 11 by placing the leading edge (lower edge shown in FIG. 3) in blade support brackets 24, 24' and 24". Align the blade bolt hole located in the base of rotor blade 16 with blade pin hole 22 located in pin bolt support bracket 17, and insert blade pin bolt 23. Install lateral support arms 25 into sleeves 26, tighten adjustment bolts 27 until the rotor blade 16 is firmly held in cutting position to prevent vibration due to cutting. On out board 24" of the blade 16, install a strap (not shown) to secure a portion of the blade after cut off is completed. Using cut off tool 15, cut off out board 24" from blade 16. Remove blade 16 from the fixture and proceed to the process of tip replacement.

While the invention has been explained with respect to a preferred embodiment thereof, it is contemplated that various changes may be made in the invention without departing from the spirit and scope thereof.

What is claimed is:

1. A blade modification tool suitable for decreasing the length of a helicopter rotor blade comprising:
    a base having a plurality of vertical sleeves,
    first bracket means for supporting a base end of said rotor blade, mounted on a first end of said base;
    second bracket means for supporting a leading edge of said rotor blade, fixed in a spaced relationship to said base and adapted to provide vertical support for said rotor blade;
    a plurality of lateral support arms mounted on a second end of said base, each of said lateral support arms comprising a pair of vertical tubes installed in said vertical sleeves, each of said vertical tubes having adjusting screws at each upper end for gripping the outer tip end of said rotor blade; and
    cutting means for surgically removing a fixed length of said outer tip end of said rotor blade.

2. A blade modification tool as claimed in claim 1 wherein said first bracket means for supporting said base end of said rotor blade includes a "U" shaped bracket having blade pin holes formed in an upper end.

3. A blade modification tool as claimed in claim 1 wherein said second bracket means for supporting a leading edge of said rotor blade comprises at least three "V" shaped brackets having vertical adjustment slots formed therein.

4. A blade modification tool as claimed in claim 1 wherein said cutting means comprises a vertically movable circular saw.

5. A blade modification tool suitable for decreasing the length of a helicopter rotor blade comprising:
    a tubular steel base rigidly fixed to a concrete floor, said base having a plurality of vertical sleeves;
    a "U" shaped steel bracket mounted on a first end of said base and having blade pin holes formed in an upper end and having vertical adjustment slots and being adapted to support a base end of said rotor blade;
    at least three "V" shaped steel brackets fixed in a spaced relationship to said base and having vertical adjustment slots formed therein and being adapted to support a leading edge of said rotor blade;
    at least two lateral support arms mounted on a second end of said base, each of said lateral support arms comprising a pair of vertical tubes installed in said vertical sleeves, each of said vertical tubes having adjusting screws at each upper end for gripping the outer tip end of said rotor blade; and
    a vertically movable circular saw located at a fixed position near said base and adapted for removing twenty four inches of said outer tip end of said rotor blade.

6. A process for converting a helicopter rotor blade to a shorter, approved length comprising the steps of:
    installing a blade bolt through a pin bolt support bracket located on a horizontal tubular base and the base end of said rotor blade;
    locating the leading edge of said rotor blade into three "V" shaped support brackets;
    installing lateral support arms on each side of said rotor blade and tightening the adjusting screws to a firm grip on said rotor blade;
    strapping the out board end of said rotor blade to said base to secure portion of blade to be cut off; and
    cutting off out board twenty four inches of said rotor blade.

* * * * *